Figure 1:
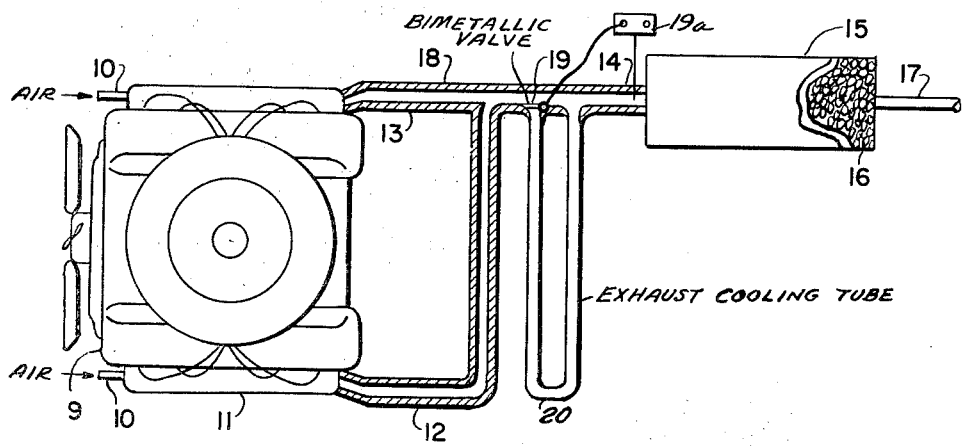

Aug. 28, 1962 S. C. EASTWOOD 3,050,935
APPARATUS FOR CATALYTICALLY TREATING INTERNAL
COMBUSTION ENGINE EXHAUST GASES
Filed Jan. 5, 1961

INVENTOR.
Sylvander C. Eastwood
BY
Raymond W. Barclay
ATTORNEY.

3,050,935
APPARATUS FOR CATALYTICALLY TREATING INTERNAL COMBUSTION ENGINE EXHAUST GASES

Sylvander C. Eastwood, Woodbury, N.J., assignor to Socony Mobil Oil Company, Inc., a corporation of New York
Filed Jan. 5, 1961, Ser. No. 80,888
3 Claims. (Cl. 60—31)

This invention relates to a system for catalytic purification of automobile exhaust gases. More particularly, the present invention is directed to a method and device for controlling the inlet temperature to an automobile catalytic converter.

As is well known, the exhaust gases of internal combustion engines contain considerable quantities of toxic and obnoxious fumes. Such fumes comprise unburned or partially burned hydrocarbons, particularly olefinic hydrocarbons, which react with nitrogen oxides and with oxygen under the influence of sunlight to produce pollutants which have a destructive odor, are irritating to the mucous membranes, particularly of the eyes and cause damage to certain species of plants. Of the toxic gases, carbon monoxide is one of the most deadly. Thus, amounts as small as 0.1 volume percent of carbon monoxide in the atmosphere is dangerous to life and lethal amounts can, without realization, be inhaled and combined with blood hemoglobin before its effects are evident. In areas of congested vehicular traffic where frequent stopping is necessary, the carbon monoxide contained in the exhaust gas of an average automobile ordinarily amounts to 4.5 percent by volume and may, at times, reach 9 percent by volume. Automobile and similar exhaust gases are also objectionable because of their malodorous constituents attributable to unburned fuel and oil and the decomposition products thereof.

It has heretofore been proposed to treat the above obnoxious and dangerous exhaust fumes by passage through a catalytic converter wherein the fumes are brought into contact with an oxidation catalyst and thereby undergo conversion. In such manner, carbon monoxide is converted to carbon dioxide and hydrocarbon constituents of the exhaust gas undergo oxidation to carbon dioxide and water. However, a major difficulty encountered in operation of such catalytic converter has been that of initially heating the catalyst mass from a cold start to catalyst activation temperature, i.e. the temperature at which the catalyst is effective to promote the oxidation of the combustible components of the exhaust stream at an appreciable rate. Suitable known catalysts generally require activation temperatures in excess of about 400° F. in order to initiate combustion of the combustible components present in the internal combustion engine exhaust gas. Moreover, as the catalyst contained in the converter is employed over an extended period of time, the maximum activation temperature thereof gradually increases to within the approximate range of 500 to 650° F.

If the sensible heat of the exhaust gas stream is depended upon to raise the catalyst to activation temperature, it has been found that under ordinary conditions of engine operation an excessively long time is required, i.e. usually from 10 to 30 minutes or longer, during which period the catalyst is not serving its intended function of bringing about oxidation of the above described toxic and obnoxious components of the exhaust gas. Once initiated, the heat produced by the exothermic catalytic oxidation of the combustible components in the exhaust gas is sufficient to maintain the catalyst temperature above the activation level and under these conditions effective elimination of the combustible components of the exhaust gas occurs. However, the problem then becomes one of controlling the temperature of the catalyst, under the varying driving speeds, below that at which activity of the catalyst is adversely thermally effected or even destroyed. Thus, at speeds above about 60 miles per hour, the inlet temperature to the converter becomes excessive. A high converter inlet temperature, i.e. above about 1000° F. will result in temperatures of 1300° F. and higher in the converter which damage the catalyst and the metal structure of the converter. Typical lined out temperatures at various car speeds are shown below:

| Speed, m.p.h. | Inlet Temp. to Converter, ° F. | Max. Temp. in Catalyst Bed, ° F. |
|---|---|---|
| 30 | 570 | 780 |
| 40 | 675 | 1,000 |
| 50 | 815 | 1,180 |
| 60 | 865 | 1,250 |

It is the principal object of the present invention to overcome the aforenoted problem by providing an inexpensive and highly effective method and device for controlling the inlet temperature to a catalytic converter. Other objects of the invention which will be apparent to those skilled in the art are evident from the description hereinafter set forth together with the accompanying drawings.

Broadly, the invention comprises a system for conducting exhaust gas from an internal combustion engine to a catalytic converter through two paths, one of which entails passage through an insulated conduit affording quick warmup of the converter from ambient temperature and maximum conservation of heat during low speed, i.e. low temperature operation, and the other of which is employed when the temperature of the exhaust gas to the converter exceeds a predetermined maximum and entails passage of the gas through an uninsulated conduit to effect cooling of the same. A temperature responsive closure means, such as a valve may be employed to divert gas flow from one path to the other.

In another embodiment, the invention provides for cooling the uninsulated conduit by continuously circulating liquid from the automobile cooling system to and through a jacket surrounding said conduit. In such arrangement, liquid from the automobile cooling system is continuously conducted to the surrounding jacket and recycled to the cooling system. As above, a temperature responsive closure or valve serves to effect passage of the exhaust gas through the liquid cooled conduit when the exhaust gas temperature exceeds a predetermined maximum.

The length of uninsulated or cooled path in either of the above arrangements is generally sufficient to lower the exhaust gas temperature to below that which would have an adverse effect on the oxidation catalyst. While the maximum temperature capable of toleration in any particular system will depend in part on the catalyst employed, it is generally preferred to maintain the inlet temperature of the exhaust gas to the catalytic converter below about 1000° F. The length of uninsulated cooled pipe is usually such that about 200° F. cooling would occur with a 1000° F. exhaust temperature at a gas flow corresponding to an automotive speed of 60 miles per hour.

The closure means employed for switching the exhaust gas flow from one path to the other in accordance with the present invention may be any feasible temperature responsive valve such as a simple thermostatic type valve commonly used on automobile engine manifold systems. Thus, the switching of gas flow may be effectively accomplished by equipping the described conduit system with a simple flapper valve operated from a bimetallic control device. Alternatively, a pneumatic or electrically operated valve, while more expensive, may be effectively employed. It is also feasible to have the control point for the temperature responsive valve located in the catalyst bed in lieu of the exhaust line.

Any suitable oxidation catalyst capable of operating over relatively long periods at temperatures of from about 600° F. to 1300° F. may be employed in the catalytic converter. Although, the invention is not limited to any particular catalyst, a preferred catalyst comprises small particles, such as spheres, extrudates, pellets, etc. of about 1/16" to 1/4" in size of a porous support such as for example, alumina, having deposited thereon or admixed therewith a metal or metal oxide or mixtures thereof having oxidation activity such as for example platinum, palladium, copper oxide, copper chromite or other mixtures of chromium and copper oxides.

Figure 2:
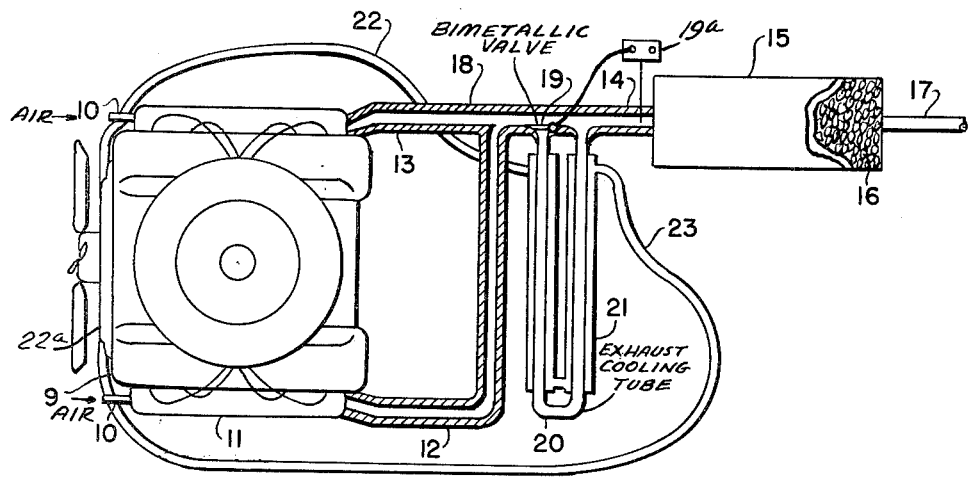

The invention may be more readily understood from a consideration of the attached drawings wherein:

FIGURE 1 depicts, in schematic form, one embodiment of the invention in which the diverted flow of exhaust gas is conducted through an uninsulated air cooled path; and FIGURE 2 depicts an alternate embodiment of the invention in which the diverted flow of exhaust gas is conducted through a path cooled by a continuously circulating stream of liquid from the automobile cooling system.

Referring more particularly to FIGURE 1, exhaust gas from an internal combustion engine 9 passes along with air introduced through inlets 10 through exhaust manifold 11 and thereafter flows through exhaust conduits 12 and 13 which join into a common conduit 14. The exhaust gas with added air then flows through a catalytic converter 15 containing a suitable oxidation catalyst 16 which serves to effect oxidation of the obnoxious and toxic components thereof. The gas after passage through the catalyst bed escapes to the atmosphere through tail pipe 17. The exhaust conduits 12, 13 and 14 are insulated with a suitable non-conducting medium 18 such as a surrounding layer of asbestos, fiber glass, or magnesia. The insulated conduits for conducting exhaust gas flow from the engine 9 to catalytic converter 15 aid in conserving sensible heat of the exhaust gas and facilitate quick warmup of the catalyst contained in said converter, markedly reducing the time required for the catalyst to attain its temperature of activation. After initiation, the heat produced by the exothermic catalytic oxidation of the combustible components in the exhaust gas is sufficient to maintain the catalyst temperature above the activation level. As the temperature of the exhaust gas increases with increasing driving speeds, a maximum is reached beyond which thermal damage to the catalyst or converter is imminent. At such point of predetermined maximum temperature, bimetallic flapper valve 19, activated by temperature responsive means 19a, functions to prevent the direct flow of hot exhaust gas into the catalytic converter and to divert the flow thereof through uninsulated U-shaped conduit 20 which serves to effect cooling of the hot exhaust gas. If the temperature of the exhaust gas is lowered to a sufficient extent that the activation level thereof is not being exceeded, such as for example by stopping and turning off the automobile engine, then the flapper valve reverts to its original position providing direct communication between the internal combustion engine and the catalytic converter.

Turning now to the embodiment shown in FIGURE 2, operation is similar to that shown in FIGURE 1, like figures connoting like parts except that in this instance, upon attainment of the maximum predetermined temperature, the flow of hot exhaust gas is diverted upon activation of valve 19 through U-shaped conduit, which is surrounded by a jacket 21 through which liquid conducted by tube 22 is continuously circulated from the engine cooling system 22a and thereafter returned to said system through tube 23. The liquid-jacketed conduit in this instance serves to rapidly and effectively lower the temperature of the exhaust gas passing therethrough. As in the operation of the embodiment shown in FIGURE 1, lowering of the temperature of the exhaust gas to below the activation level of the catalyst causes the flapper valve to revert to its original position.

As will be realized, the switching of valve 19 may take place a number of times during the course of driving depending on the speed at which the engine operates, the nature of the traffic conditions involved, i.e. whether on the open road or whether in congested traffic areas, atmospheric temperature conditions and various other factors.

It is to be understood that the above description is merely illustrative of preferred embodiments of the invention, of which many variations may be made within the scope of the following claims by those skilled in the art without departing from the spirit thereof.

I claim:

1. In combination with an internal combustion engine, a catalytic converter containing a bed of oxidation catalyst and communicating with the exhaust outlet of said engine through a system comprising two alternative conduits, one of which is insulated against loss of heat of the exhaust gas of said internal combustion engine flowing therethrough and the other of which is uninsulated to reduce the temperature of the exhaust gas flowing therethrough, a valve in said system responsive to temperature changes in said exhaust gas and means for controlling said valve to divert the flow of said exhaust gas from said insulated conduit to said uninsulated conduit as a function of a predetermined temperature level in said exhaust gas and to thereby control the inlet temperature of exhaust gas to said converter.

2. An apparatus for treating gases from the exhaust of an internal combustion engine equipped with a cooling system comprising a catalytic converter containing a bed of oxidation catalyst and communicating with the exhaust outlet of said engine through a system comprising two alternative conduits, one of which is insulated against loss of heat of the exhaust gas of said internal combustion engine flowing therethrough and the other of which is uninsulated and surrounded by a jacket, means for continuously recycling liquid from the cooling system of said engine to said jacket to reduce the temperature of the exhaust gas flowing through said uninsulated conduit, a valve in said system responsive to temperature changes in said exhaust gas and means for controlling said valve to divert the flow of exhaust gas from said insulated conduit to said uninsulated conduit as a function of a predetermined temperature level in said exhaust gas and to thereby control the inlet temperature of exhaust gas to said converter.

3. An apparatus for treating gases from the exhaust of an internal combustion engine comprising a catalytic converter containing a bed of oxidation catalyst, a system of two alternative conduits for conducting the exhaust gas of said internal combustion engine to said converter, means for maintaining a temperature differential in the alternative paths provided by said conduits, a valve in said system responsive to temperature changes in said exhaust gas and means for controlling said valve to respectively direct the flow of said exhaust gas separately through one of said conduits to the exclusion of the other of said conduits as a function of a predetermined temperature level in said exhaust gas and to thereby control the inlet temperature of exhaust gas to said converter.

References Cited in the file of this patent

UNITED STATES PATENTS

| | | |
|---|---|---|
| 1,132,391 | Ruttle | Mar. 16, 1915 |
| 1,217,587 | Fulton | Feb. 27, 1917 |
| 1,867,802 | Bogert | July 19, 1932 |
| 2,087,411 | Lundquist | July 20, 1937 |
| 2,206,258 | Laguzzi | July 2, 1940 |
| 2,461,580 | Wiczer et al. | Feb. 15, 1949 |
| 2,488,563 | Sills | Nov. 22, 1949 |
| 2,612,745 | Vecchio | Oct. 7, 1952 |